(12) United States Patent
Kamiya

(10) Patent No.: US 10,270,307 B2
(45) Date of Patent: Apr. 23, 2019

(54) ELECTRIC MOTOR HAVING AIR PURGING FUNCTION

(71) Applicant: FANUC CORPORATION, Yamanashi (JP)

(72) Inventor: Yohei Kamiya, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 14 days.

(21) Appl. No.: 15/725,365

(22) Filed: Oct. 5, 2017

(65) Prior Publication Data

US 2018/0115212 A1 Apr. 26, 2018

(30) Foreign Application Priority Data

Oct. 21, 2016 (JP) .................................. 2016-207066

(51) Int. Cl.
*H02K 9/00* (2006.01)
*H02K 5/10* (2006.01)
(Continued)

(52) U.S. Cl.
CPC .............. *H02K 5/10* (2013.01); *B01D 45/14* (2013.01); *B08B 5/02* (2013.01); *B08B 17/02* (2013.01); *H02K 5/124* (2013.01); *H02K 15/00* (2013.01); *B23Q 11/08* (2013.01); *H02K 7/14* (2013.01); *H02K 7/145* (2013.01); *H02K 9/26* (2013.01); *H02K 2205/09* (2013.01)

(58) Field of Classification Search
CPC .......... H02K 5/10; H02K 5/124; H02K 15/00; H02K 7/14; H02K 7/145; H02K 9/26; H02K 2205/09

USPC .......................................... 310/52–59, 89–90
See application file for complete search history.

(56) References Cited

U.S. PATENT DOCUMENTS 4,228,374 A * 10/1980 Elsel ........................ H02K 9/20
  310/53
4,443,723 A *  4/1984 Ohkubo ................... H02K 9/00
  310/53
(Continued)

FOREIGN PATENT DOCUMENTS

JP          51144636 U      11/1976
JP          10132088 A       5/1998
(Continued)

OTHER PUBLICATIONS

English Machine Translation for Japanese Publication No. JPS51-144636 U, published Nov. 20, 1976, 4 pgs.
(Continued)

*Primary Examiner* — Thanh Lam
(74) *Attorney, Agent, or Firm* — Fredrikson & Byron, P.A.

(57) ABSTRACT

A front housing of an electric motor includes an air discharging member for discharging air toward a rotary shaft. The front housing includes an annular first air chamber that is formed in the air discharging member, and an annular second air chamber that is formed outside the first air chamber. The front housing includes an air supply path for supplying compressed air to the second air chamber, and a connection flow passage for causing the first air chamber to communicate with the second air chamber. The connection flow passage is formed at a position other than a position of the air supply path in the circumferential direction of the housing.

3 Claims, 4 Drawing Sheets

(51) Int. Cl.
  *B01D 45/14*   (2006.01)
  *B08B 5/02*    (2006.01)
  *B08B 17/02*   (2006.01)
  *H02K 15/00*   (2006.01)
  *H02K 5/124*   (2006.01)
  *B23Q 11/08*   (2006.01)
  *H02K 7/14*    (2006.01)
  *H02K 9/26*    (2006.01)

(56) References Cited

U.S. PATENT DOCUMENTS

| | | | |
|---|---|---|---|
| 6,342,741 B1 * | 1/2002 | Fukui | F04D 25/082 310/60 A |
| 7,800,267 B2 * | 9/2010 | Sahara | F16C 25/08 310/401 |
| 2018/0278117 A1 * | 9/2018 | Katsuki | H02K 5/10 |

FOREIGN PATENT DOCUMENTS

| | | | |
|---|---|---|---|
| JP | 2007105850 A | 4/2007 | |
| JP | 2013236473 A | 11/2013 | |

OTHER PUBLICATIONS

English Abstract and Machine Translation for Japanese Publication No. JPH10-132088 A, published May 22, 1998, 8 pgs.

English Abstract and Machine Translation for Japanese Publication No. 2013236473 A, published Nov. 11, 2013, 11 pgs.

English Machine Translation and Abstract for Japanese Publication No. 2007105850 A, published Apr. 26, 2007, 12 pgs.

Untranslated Decision to Grant a Patent mailed by Japan Patent Office (JPO) for Application No. JP 2016-207066, dated Jul. 3, 2018, 3 pages.

English machine translation of Decision to Grant a Patent mailed by Japan Patent Office (JPO) for Application No. JP 2016-207066, dated Jul. 3, 2018, 3 pages.

Untranslated Notification of Reasons for Refusal mailed by Japan Patent Office (JPO) for Application No. JP 2016-207066, dated Mar. 20, 2018, 3 pages.

Translated Notification of Reasons for Refusal mailed by Japan Patent Office (JPO) for Application No. JP 2016-207066, dated Mar. 20, 2018, 3 pages.

* cited by examiner

ELECTRIC MOTOR HAVING AIR PURGING FUNCTION

BACKGROUND OF THE INVENTION

1. Field of the Invention

The present invention relates to an electric motor that has air purging function for preventing foreign substances from entering the inside of the electric motor.

2. Description of the Related Art

Electric motors are used, in some cases, in an environment in which foreign substances scatter. For example, a spindle head of a machine tool is disposed in a processing chamber for processing workpieces. The spindle head is used in an environment in which foreign substances such as chips occurring during cutting and cutting fluid scatter. The spindle head includes an electric motor for rotating a spindle. When foreign substances enter the inside of the electric motor, an insulation failure may occur in a coil, or a bearing function may be impaired. Thus, it is preferable that the electric motor has a mechanism for preventing foreign substances from entering the inside of the electric motor. An electric motor in which, for example, a sealing member is provided between a housing and a rotary shaft has been known. Further, an electric motor in which air is supplied between a housing and a rotary shaft has been known.

Japanese Unexamined Patent Publication No. 2007-105850 discloses an electric motor in which compressed air, which has been supplied to the inside of a housing, passes between a stator core and a rotor, and is supplied to a front housing. In this electric motor, the compressed air is injected toward the surface of a rotary shaft via an air exhaust passage that is formed so as to bypass a bearing.

Japanese Unexamined Patent Publication No. 2013-236473 discloses an electric motor that is provided with an air purging device attached to an end face of a housing, and discloses that this air purging device supplies air to a clearance between the inner peripheral surface of the air purging device and the outer peripheral surface of an output shaft.

SUMMARY OF THE INVENTION

In an electric motor that activates at low rotation rate, a sealing member such as an oil seal can be provided between a housing and a rotary shaft. However, in the case of an electric motor that activate at high rotation rate, for example, at more than 8,000 rpm, the oil seal wears. Thus, a desired sealing function cannot be achieved in some cases.

In the electric motors disclosed in Japanese Unexamined Patent Publication No. 2007-105850 and Japanese Unexamined Patent Publication No. 2013-236473, air is injected from one portion toward the surface of the rotary shaft. Thus, a problem arises in which foreign substances easily enter, for example, the portion of the rotary shaft opposite to the potion with which air collides.

The electric motor of the present invention is provided with a rotor including a rotary shaft, and a housing that supports the rotary shaft and that is disposed on one side of the rotary shaft, which is coupled to another member. The housing includes an air discharging member that surrounds the rotary shaft and discharges air toward the rotary shaft. The air discharging member is opposed to the rotary shaft and is formed so as to discharge air to the outside through a clearance between the air discharging member and the rotary shaft. The housing includes an annular first air chamber that is formed in the air discharging member, and an annular second air chamber that is formed outside the first air chamber. The housing includes an air supply path that extends in the radial direction so as to supply compressed air to the second air chamber, and a connection flow passage that extends in the radial direction so as to cause the first air chamber to communicate with the second air chamber. The connection flow passage is formed at a position other than a position of the air supply path in the circumferential direction of the housing.

In the above invention, the connection flow passage can include a portion that has a cross-sectional area smaller than a cross-sectional area taken along a plane perpendicular to the direction in which the first air chamber extends and a cross-sectional area taken along a plane perpendicular to the direction in which the second air chamber extends.

In the above invention, the housing can include a plurality of the connection flow passages, and the plurality of the connection flow passages can be formed at equal intervals in the circumferential direction.

In the above invention, the rotary shaft can include a ring part that is formed in the circumferential direction. The housing can include a cylindrical member and a bearing support member that is secured to the cylindrical member and secures an outer ring of the bearing. The air discharging member can be secured to the bearing support member and formed so as to be opposed to the ring part. The first air chamber can be formed in the air discharging member and can be constituted by a recess that extends in the circumferential direction. The second air chamber can be constituted by a recess that is formed in the outer peripheral surface of the bearing support member. The air supply path can be constituted by a hole that is formed in the cylindrical member and that extends in the radial direction. The connection flow passage can be formed by a hole that is formed in the bearing support member and that extends in the radial direction, and a hole that is formed in the air discharging member and that extends in the radial direction.

DETAILED DESCRIPTION

With reference to FIG. 1 to FIG. 4, an electric motor in an embodiment will be described. The electric motor of the present embodiment is used in an environment in which foreign substances scatter. The electric motor of the present embodiment rotates a spindle, to which a tool is attached, in a machine tool. The electric motor of the present embodiment is disposed in the inside of a spindle head of the machine tool.

The spindle head is disposed inside a processing chamber of the machine tool. Around the spindle head there are foreign substances such as chips occurring when a workpiece is cut and droplets of cutting fluid sprayed to the processing chamber. The electric motor of the present embodiment has a structure for preventing these foreign substances from entering the inside.

Figure 1:
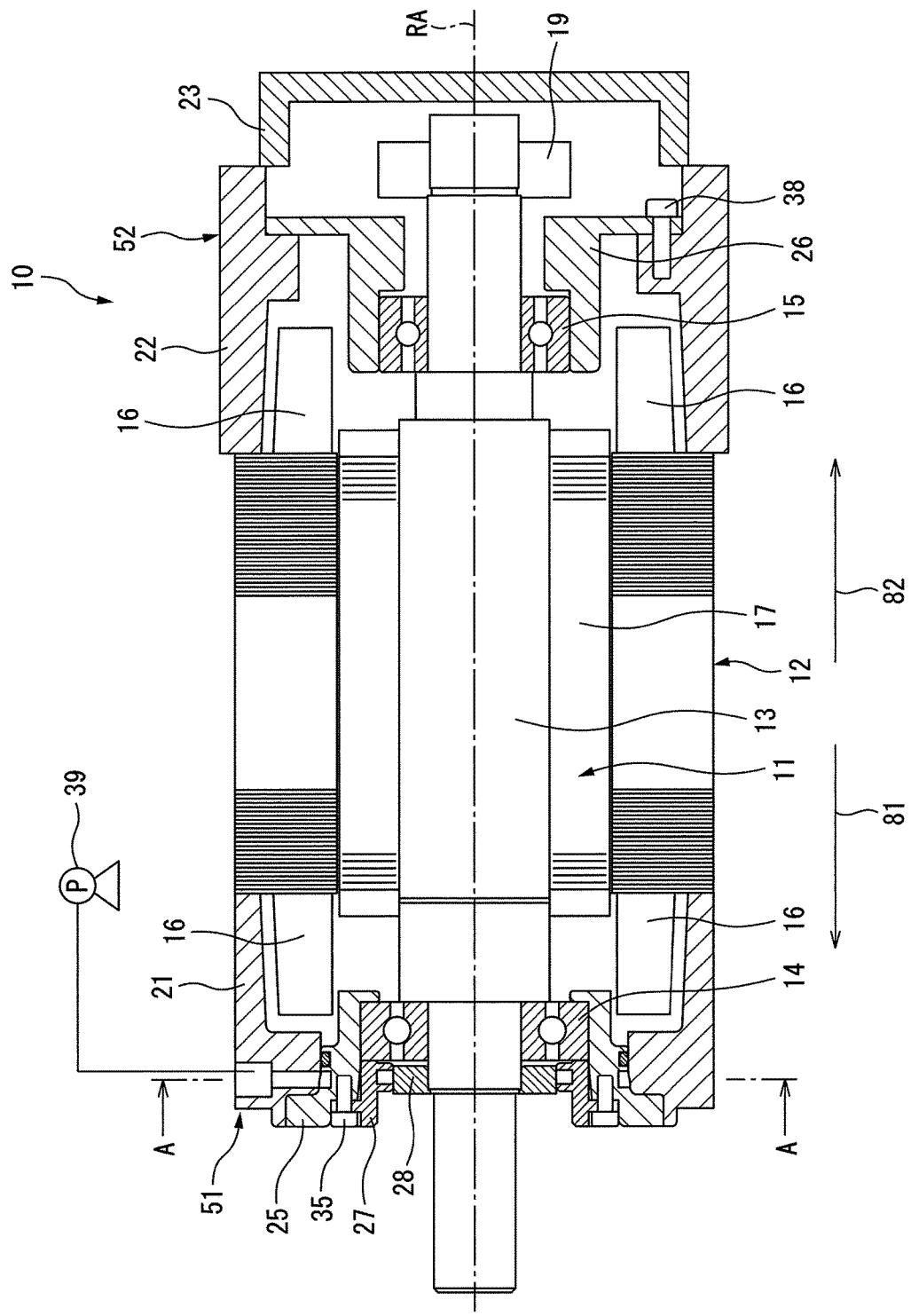
FIG. 1 is a partial sectional view of an electric motor in an embodiment.

FIG. 1 is a sectional view of an electric motor of the present embodiment. An electric motor 10 is provided with a rotor 11 and a stator 12. The stator 12 is formed by, for example, a plurality of magnetic steel plates that are axially stacked. A coil 16 is wound in the stator 12. The rotor 11 has a rod-like rotary shaft 13 and a rotor core 17 that is secured on the outside of the rotary shaft 13 and that has a plurality of magnets. The rotary shaft 13 is coupled to another member such as a spindle for transmitting rotation force.

The rotary shaft 13 rotates about a rotation axis RA. The axial direction of the present embodiment represents a direction in which the rotation axis RA of the rotary shaft 13 extends. The radial direction of the present embodiment represents a radial direction of a circle which has a center at the rotation axis RA. The circumferential direction of the present embodiment represents a direction of the circumference of a circle which has a center at the rotation axis RA. Further, in the electric motor 10, the side of the rotary shaft 13 that is coupled to another member is referred to as the front side. Further, the side opposite to the front side is referred to as the rear side. In the example shown in FIG. 1, the arrow 81 represents the front side of the electric motor 10, and the arrow 82 represents the rear side of the electric motor 10.

The electric motor 10 includes, as the housing, a front housing 51 and a rear housing 52. The stator 12 is secured to the housing. Further, the housing rotatably supports the rotor 11 via a bearing.

The rear housing 52 includes a cylindrical member 22 that is formed in a cylindrical shape and functions as a main body of the rear housing 52, and a bearing support member 26 for supporting a rear bearing 15. The bearing support member 26 is secured to the cylindrical member 22 by a bolt 38. The bearing support member 26 supports an outer ring of the rear bearing 15. An inner ring of the rear bearing 15 supports the rotary shaft 13.

An encoder 19 for detecting the rotational position and the number of rotations of the rotary shaft 13 is disposed at the rear end of the rotary shaft 13. A rear cover 23 for closing the inner space of the cylindrical member 22 is secured to the rear end of the cylindrical member 22.

The front housing 51 includes a cylindrical member 21 that is formed in a cylindrical shape and functions as a main body of the front housing. The stator 12 is secured to the cylindrical member 21 of the front housing 51 and the cylindrical member 22 of the rear housing 52. The rotary shaft 13 of the rotor 11 is supported by a front bearing 14 serving as a bearing that is supported by the cylindrical member 21, and the rear bearing 15 serving as a bearing that is supported by the cylindrical member 22.

Figure 2:
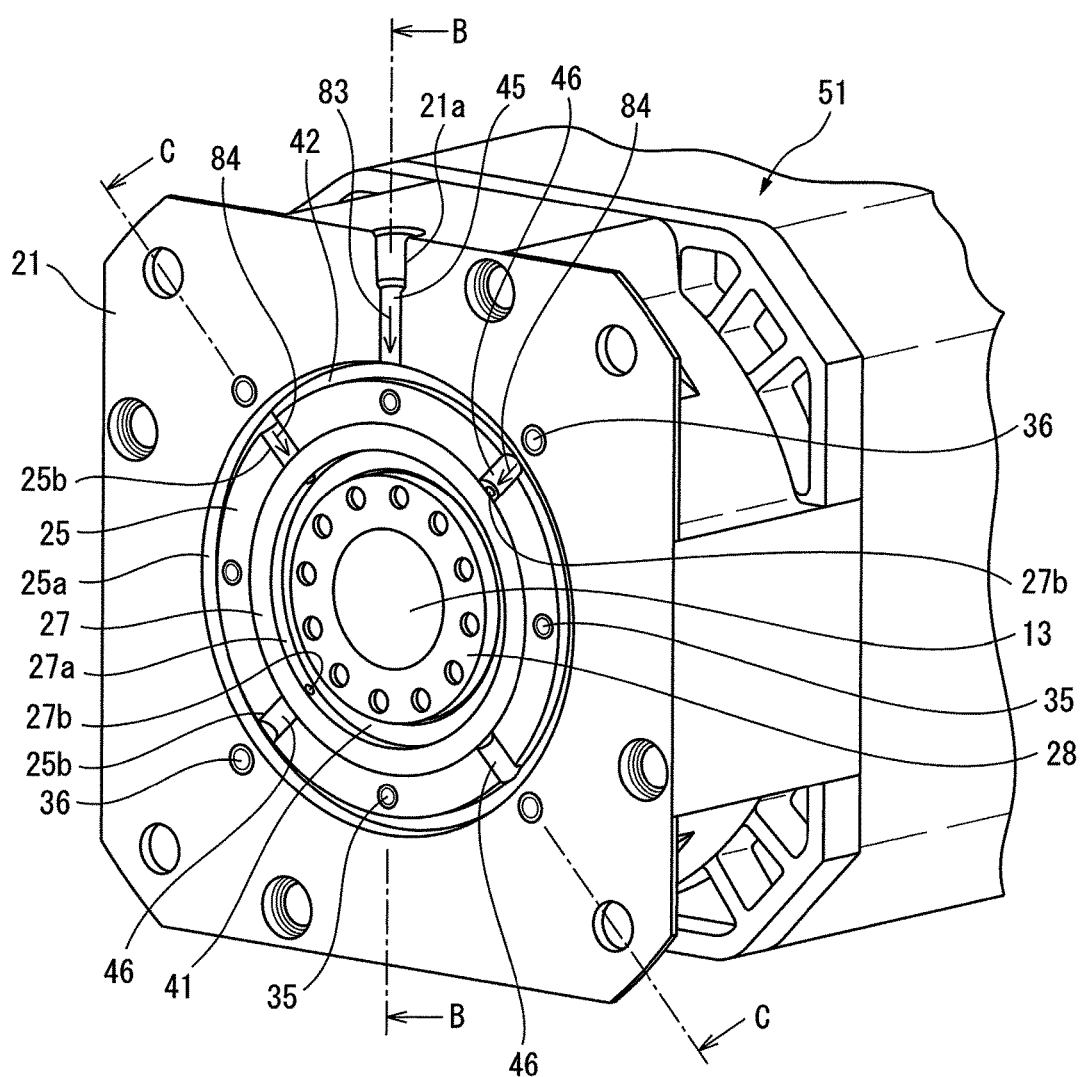
FIG. 2 is an exploded perspective view of a front housing of the electric motor in the embodiment.
Figure 3:
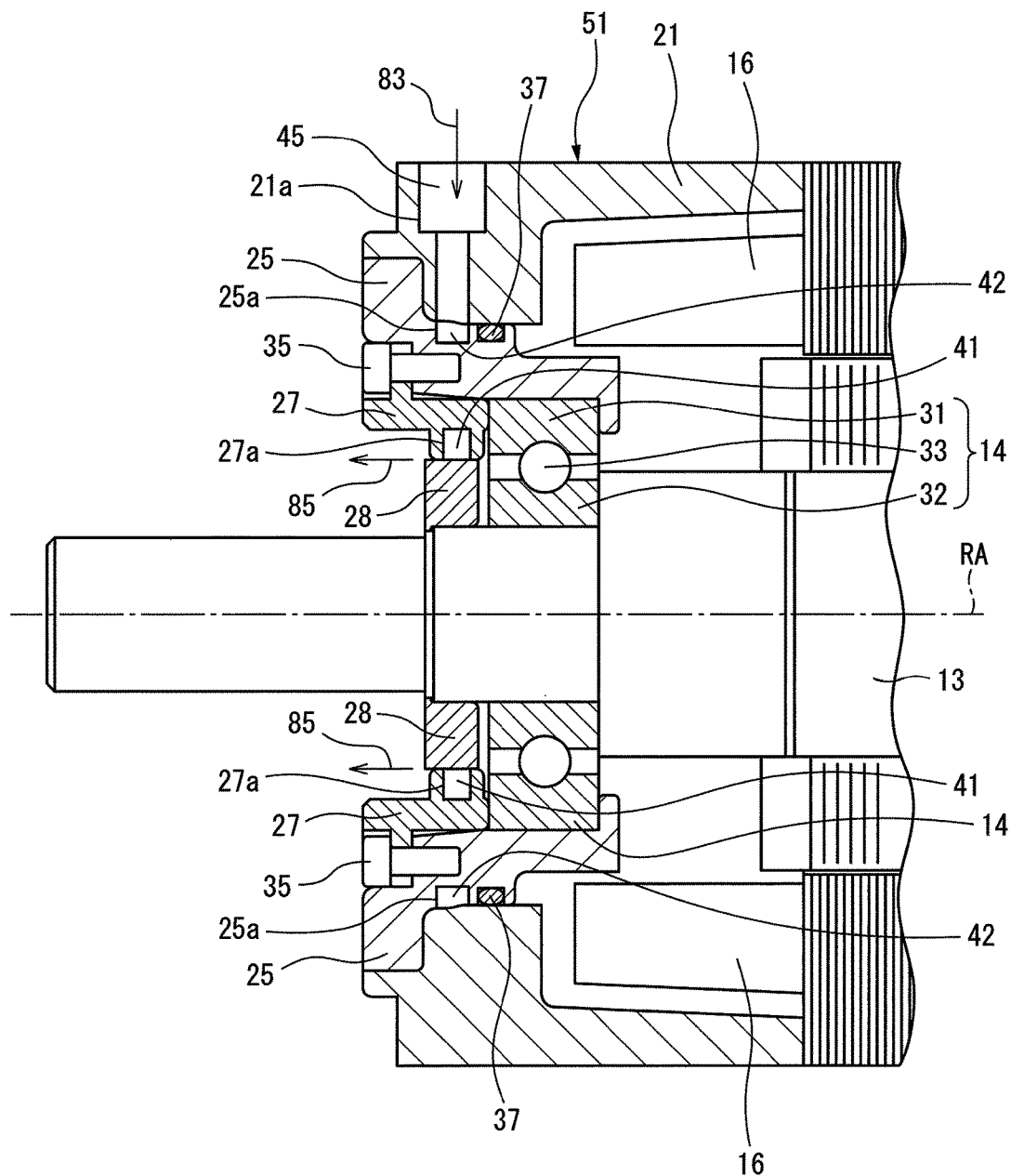
FIG. 3 is first enlarged partial sectional view of the front housing of the electric motor in the embodiment.
Figure 4:
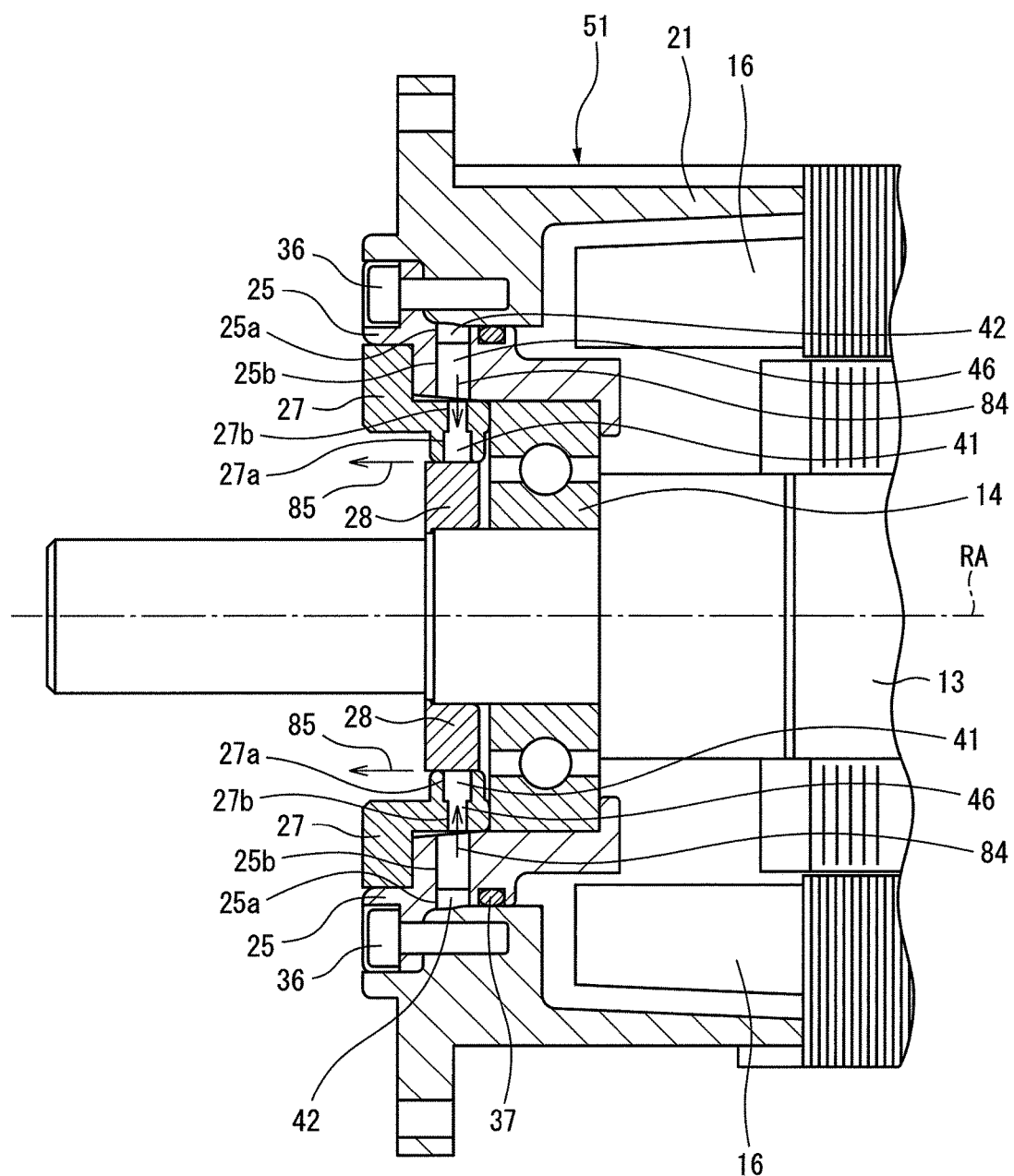
FIG. 4 is second enlarged partial sectional view of the front housing of the electric motor in the embodiment.

FIG. 2 shows an exploded perspective view obtained by cutting the front housing in the present embodiment. FIG. 2 is a perspective view taken along the line A-A in FIG. 1. FIG. 3 shows an enlarged sectional view of the front housing in the present embodiment. FIG. 3 is a sectional view taken along the line B-B in FIG. 2. FIG. 4 shows another enlarged sectional view of the front housing in the present embodiment. FIG. 4 is a sectional view taken along the line C-C in FIG. 2.

With reference to FIG. 2 to FIG. 4, the front housing 51 includes a bearing support member 25 that is secured to the cylindrical member 21. The bearing support member 25 supports the front bearing 14. The bearing support member 25 is secured to the cylindrical member 21 by the bolts 36 serving as fastening members. The bearing support member 25 is secured to the front end face of the cylindrical member 21. A sealing member 37 for sealing the inner space of the cylindrical member 21 is disposed between the bearing support member 25 and the cylindrical member 21.

The front bearing 14 rotatably supports the front end of the rotary shaft 13. The front bearing 14 includes an outer ring 31, an inner ring 32, and balls 33 arranged between the outer ring 31 and the inner ring 32. The inner ring 32 rotates along with the rotary shaft 13. The bearing support member 25 secures the outer ring 31 of the front bearing 14. The bearing support member 25 is formed into an annular shape so as to cover the front bearing 14 in the circumferential direction.

The electric motor 10 of the present embodiment has an air purging function. The front housing 51 includes an air discharging member 27 for discharging air toward the rotary shaft 13. The air discharging member 27 is formed so as to surround the rotary shaft 13. The air discharging member 27 is secured to the bearing support member 25 by bolts 35. The air discharging member 27 is secured to the front end face of the bearing support member 25. The air discharging member 27 is formed into an annular shape.

The rotary shaft 13 in the present embodiment includes a ring member 28 that functions as a ring part projecting from the surface. The ring member 28 is formed into an annular shape. The ring member 28 is opposed to the air discharging member 27. A clearance is formed between the ring member 28 and the air discharging member 27 so as to discharge air to the outside. The small clearance between the ring member 28 and the air discharging member 27 constitutes a labyrinth passage.

The air discharging member 27 is disposed outside the front bearing 14. The ring member 28 is disposed outside the front bearing 14. The air discharging member 27 is formed so as to discharge air from the clearance between the air discharging member 27 and the rotary shaft 13 toward the outside.

A first air chamber 41 to be filled with compressed air is formed inside the air discharging member 27. The first air chamber 41 is constituted by a recess 27a that is formed inside the air discharging member 27. The recess 27a is formed into an annular shape, and extends in the circumferential direction. In other words, the first air chamber 41 is formed into an annular shape. The first air chamber 41 functions as a flow passage through which air passes.

The front housing 51 includes a second air chamber 42 that is formed into an annular shape outside the first air chamber 41. The second air chamber 42 is constituted by a recess 25a that is formed in the outer peripheral surface of the bearing support member 25. In other words, the second air chamber 42 is formed by a space surrounded by the recess 25a circumferentially formed in the bearing support member 25 and the inner peripheral surface of the cylindrical member 21. The second air chamber 42 is formed into an annular shape. The second air chamber 42 of the present embodiment is coaxially formed with the first air chamber 41.

An air supply path 45 for supplying compressed air to the second air chamber 42 is formed in the cylindrical member 21. The air supply path 45 is constituted by a hole 21a that is formed in the cylindrical member 21 and extending in the radial direction. The air supply path 45 communicates with the second air chamber 42. An air pump 39 is connected to the air supply path 45 via an air supply tube. Compressed air is supplied to the air supply path 45.

The front housing 51 includes connection flow passages 46 extending in the radial direction so as to cause the first air chamber 41 to communicate with the second air chamber 42. The connection flow passages 46 in the present embodiment are each constituted by a hole 25b that is formed in the bearing support member 25 and extends in the radial direction, and a hole 27b that is formed in the air discharging member 27 and extends in the radial direction.

The front housing 51 of the present embodiment includes a plurality of connection flow passages 46. The connection flow passages 46 are arranged at equal intervals in the circumferential direction. In the present embodiment, four connection flow passages 46 are formed. The number of connection flow passages is not limited to this embodiment, and any number of connection flow passages 46 can be formed. For example, the number of connection flow passages may be one.

The connection flow passages 46 of the present embodiment are formed at positions, in the circumferential direction of the front housing 51, other than the position of the air supply path 45. In other words, the connection flow passages 46 are formed at positions that are deviated from the position of the air supply path 45, so as not to be aligned with the air supply path 45.

With reference to FIG. 1 to FIG. 4, the compressed air that has been supplied by the air pump 39 is supplied to the second air chamber 42 through the air supply path 45 as designated by arrow 83. The compressed air is charged to the annular second air chamber 42. The compressed air passes through the inside of the second air chamber 42. The compressed air passes from the second air chamber 42 to the first air chamber 41 through the connection flow passages 46 as designated by arrow 84. The first air chamber 41 is filled with the compressed air. The compressed air passes from the first air chamber 41 to the outside through the clearance between the air discharging member 27 and the ring member 28 as designated by arrow 85. For this reason, foreign substances can be prevented from entering the inside of the electric motor 10 through the clearance between the ring member 28 and the air discharging member 27.

When the electric motor 10 is driven, the ring member 28 of the rotary shaft 13 rotates at a high speed. For this reason, the foreign substances that collide with the ring member 28 are transferred radially outward by centrifugal force. The foreign substances are prevented from entering the inside of the electric motor 10. Even when the number of rotations of the rotary shaft 13 decreases, or the rotation of the rotary shaft 13 stops, the compressed air is injected forward from the first air chamber 41 as designated by arrow 85, and accordingly, the foreign substances can be prevented from entering the inside of the electric motor 10. Note that, even when the electric motor 10 is driven at a high speed, the compressed air may be injected from the first air chamber 41.

The compressed air of the present embodiment is supplied from the air supply path 45 to the second air chamber 42 as designated by arrow 83. The connection flow passages 46 are formed at positions other than the position of the air supply path 45. In other words, each connection flow passage 46 and the air supply path 45 are formed so as not to be aligned with each other. For this reason, the air that passes through the air supply path 45 collides with the surface of the second air chamber 42. After that, the compressed air passes along the second air chamber 42. Thus, in the inside of the second air chamber 42, the pressure of air is substantially uniform in the circumferential direction.

Subsequently, the compressed air passes through the connection flow passages 46, and is supplied to the first air chamber 41 as designated by arrow 84. In the inside of the first air chamber 41, the air is charged, and the pressure is substantially uniform in the circumferential direction. Thus, the compressed air can be supplied to the entire outer peripheral surface of the ring member 28 at substantially the same pressure. The air is entirely uniformly discharged in the circumferential direction from the clearance (labyrinth passage) between the ring member 28 and the air discharging member 27. For this reason, the entry of foreign substances through the clearance can be entirely prevented in the circumferential direction. For example, the entry of foreign substances through the portion in which the flow rate of the injected air is small can be avoided.

In the electric motor 10 of the present embodiment, the first air chamber 41 is formed so that the pressure of the air is uniformly applied to the entirety of the labyrinth passage. Further, in the first air chamber 41, the second air chamber 42 and the connection flow passages 46 are formed so that the pressure is equalized in the circumferential direction.

Specifically, in the front housing 51 in the present embodiment, a plurality of the connection flow passages 46 are arranged at equal intervals in the circumferential direction. For this reason, the air is supplied to the first air chamber 41 through the plurality of the connection flow passages 46. Thus, the first air chamber 41 is entirely filled with air at a uniform pressure. In the circumferential direction of the first air chamber 41, the pressure can be prevented from being uneven. In other words, the air can be entirely discharged at a uniform flow rate in the circumferential direction through the clearance between the ring member 28 and the air discharging member 27. Note that the arrangement of the plurality of connection flow passages at equal intervals in the circumferential direction is not necessarily required. The plurality of the connection flow passages may be, for example, arranged at different intervals in the circumferential direction.

Further, the connection flow passage 46 of the present embodiment includes a portion that has a sectional area smaller than a sectional area taken along a plane perpendicular to the direction in which the first air chamber 41 extends and a sectional area taken along a plane perpendicular to the direction in which the second air chamber 42 extends. In the present embodiment, the flow passage cross-sectional area of the hole 27b that is formed in the air discharging member 27 is smaller than the flow passage cross-sectional area of the first air chamber 41 and the flow passage cross-sectional area of the second air chamber 42. By adopting the configuration in which the connection flow passage has a portion having a reduced cross-sectional area, the flow rate of air that passes through the connection flow passage can be restricted. The unevenness of the pressure in the circumferential direction of the second air chamber 42 due to large amount of compressed air passing through the connection flow passage can be suppressed. Consequently, air that has a constant pressure can be supplied to the entirety of the first air chamber 41. The unevenness of the pressure in the circumferential direction of the first air chamber 41 can be suppressed. Note that the configuration in which the connection flow passage includes the portion having the flow passage cross-sectional area smaller than the flow passage cross-sectional area of the first air chamber and the flow passage cross-sectional area of the second air chamber is not necessarily required.

In the present embodiment, two annular air chambers are formed in the front housing 51, but the embodiment is not limited to this configuration. Three or more air chambers may be formed in the front housing. With reference to, for example, FIG. 2, a third air chamber may be formed outside the second air chamber 42. In this respect, the third air chamber can be coaxially formed with the second air chamber. An air supply path is connected to the third air chamber. Further, the second air chamber and the third air chamber can be connected by connection flow passages that extend in the radial direction. It is preferable to dispose each connection flow passage that is deviated from the air supply path, so as not to be aligned with the air supply path.

The first air chamber of the present embodiment is constituted by the recess that is formed in the air discharging member, but the embodiment is not limited to this configuration. The first air chamber can be formed into an annular shape, and can adopt any configuration for supplying air toward the rotary shaft. Further, the air discharging member can be formed so as to discharge air through a slight clearance with the outer peripheral surface of the rotary shaft.

The second air chamber in the present embodiment is constituted by the recess formed in the bearing support member, but the embodiment is not limited to this configuration. The second air chamber can adopt any air chamber that is formed into an annular shape, outside the first air chamber. The second air chamber may be constituted by, for example, a recess formed in the inner peripheral surface of the cylindrical member.

The electric motor in the present embodiment is an electric motor for rotating the spindle of a machine tool, but the embodiment is not limited to this configuration. The present invention can be applied to any electric motor that is disposed in an environment in which there is a possibility of entry of foreign substances.

According to the present invention, the electric motor that suppresses the entry of foreign substances can be provided.

The aforementioned embodiments can be appropriately combined. In each figure described above, the same or similar members are designated with the same reference numerals. Note that the aforementioned embodiments are examples, and do not limit the present invention. Further, the embodiments include modifications of the features described in the claims.

The invention claimed is:

1. An electric motor comprising:
a rotor including a rotary shaft; and
a housing that supports the rotary shaft and that is disposed on one side of the rotary shaft, which is coupled to another member, wherein
the housing includes a cylindrical member, a bearing support member that is secured to the cylindrical member and secures an outer ring of a bearing, and an air discharging member that surrounds the rotary shaft and discharges air toward the rotary shaft,
the air discharging member is opposed to the rotary shaft and formed so as to discharge air to the outside through a clearance between the air discharging member and the rotary shaft,
the housing includes an annular first air chamber formed in the air discharging member, an annular second air chamber formed outside the first air chamber, an air supply path extending in the radial direction so as to supply compressed air to the second air chamber, and a connection flow passage extending in the radial direction so as to cause the first air chamber to communicate with the second air chamber,
the connection flow passage is formed at a position other than a position of the air supply path in the circumferential direction of the housing,
the rotary shaft includes a ring part formed in the circumferential direction,
the air discharging member is secured to the bearing support member and formed so as to be opposed to the ring part,
the first air chamber is formed in the air discharging member and constituted by a recess extending in the circumferential direction and the second air chamber is constituted by a recess formed in the outer peripheral surface of the bearing support member,
the air supply path is constituted by a hole that is formed in the cylindrical member and extends in the radial direction, and
the connection flow passage is constituted by a hole that is formed in the bearing support member and extends in the radial direction, and a hole that is formed in the air discharging member and extends in the radial direction.

2. The electric motor according to claim 1, wherein the connection flow passage includes a portion having a cross-sectional area smaller than a cross-sectional area taken along a plane perpendicular to the direction in which the first air chamber extends and a cross-sectional area taken along a plane perpendicular to the direction in which the second air chamber extends.

3. The electric motor according to claim 1, wherein
the housing includes a plurality of the connection flow passages, and
the plurality of connection flow passages are formed at equal intervals in the circumferential direction.

* * * * *